United States Patent [19]

Lambright et al.

[11] 4,279,026

[45] Jul. 14, 1981

[54] SEISMOGRAPHIC DATA COLOR DISPLAY

[75] Inventors: Orbie N. Lambright; Mangat R. Thapar, both of Tulsa, Okla.

[73] Assignee: Cities Service Company, Tulsa, Okla.

[21] Appl. No.: 938,682

[22] Filed: Aug. 31, 1978

[51] Int. Cl.³ .............................................. G01V 1/34
[52] U.S. Cl. ...................................... 367/70; 367/47; 346/33 C
[58] Field of Search .............. 340/15.5 DS; 346/33 C, 346/46, 107 SC; 343/5 CD; 355/32; 101/211; 178/15; 367/70

[56] References Cited

U.S. PATENT DOCUMENTS

| | | | |
|---|---|---|---|
| 3,209,320 | 9/1965 | Earthmar | 340/15.5 DS |
| 3,662,325 | 5/1972 | Savit | 340/15.5 DS |
| 3,781,785 | 12/1973 | Balch | 340/15.5 DS |
| 3,961,306 | 6/1976 | Anstey | 340/15.5 DS |
| 3,975,705 | 8/1976 | Klein et al. | 340/15.5 DS |

FOREIGN PATENT DOCUMENTS 2252620  5/1973  Fed. Rep. of Germany ........ 346/33 C

OTHER PUBLICATIONS

Balch, "Color Sonagrams: A New Dimension In Seismic Data Interpretation", 12/71, pp. 1074-1098, Geophysics, vol. 36, #6.

Primary Examiner—Nelson Moskowitz
Attorney, Agent, or Firm—Donald L. Traut; Walter M. Benjamin

[57] ABSTRACT

A new and improved method of forming a color graphic display from seismographic input data is disclosed. The input data sequence is processed to obtain the absolute value of each amplitude value and to select the maximum amplitude value of each oscillation of the waveform. A predetermined number of the largest selected values are classified into a first range of values, the remaining values are scaled according to magnitude into a preset number of ranges and an assignment table is formed with each range being represented by a primary or secondary color. Data corresponding to a first group of ranges of input data is processed to form a representation for a particular color. Similarly, the remaining data groups, corresponding to the remaining ranges, are processed to form a representation of the remaining colors. The image of each representation is sequentially transferred to a sheet and the images are colored with their respective colors, thus producing a color display of the seismic data.

2 Claims, 7 Drawing Figures

SEISMOGRAPHIC DATA COLOR DISPLAY

BACKGROUND OF THE INVENTION

1. Field of Invention

This invention is concerned with the display in color of variables presented as waveforms. It is also concerned with the combined display, for visual appraisal, of several quantities which are different functions of the same variable or variables. More specifically, it is concerned with the combined display of different seismic functions.

2. Description of Prior Art

In several branches of science useful conclusions can be drawn from variations of several quantities as a function of a common variable. One example is in seismic exploration, where the use of colors by geophysicists and geologists to display their interpretation of recorded or observed data in the form of geological cross-sections is known.

A color display adds certain computed quantities to the conventional black and white display. For example, a conventional black and white display shows a plot of reflective amplitude versus recorded time. By using color displays, frequency and velocity can be incorporated.

A particular method of forming color displays of seismic data is illustrated by U.S. Pat. No. 3,961,306, issued June 1, 1976 which is hereby incorporated by reference. The method comprises processing input seismic data to form a color assignment table of 40 colors for various ranges of magnitude of the positive amplitudes forming a first color component display for a first group of amplitudes, repeating this step to produce displays for a preselected number of additional colors, and superimposing the displays to form a color graphic display. The number of colors utilized incorporate multiple shades of the various colors.

More particularly, each oscillation of the prior art is divided arbitrarily into one or more partitions and each partition was colored according to a sample value or values falling within that particular partition. This resulted in oscillations having one or more colors, which could cause confusion in the analysis of the seismic display.

SUMMARY OF INVENTION

Briefly, the present invention provides a new and improved method for display, in color, of a plurality of physical measurements which represent different functions of the same variable. These displays may be associated with the display of such functions in the variable-area form of optical recording of images on film. It has been found that such displays convey to the eye of the analyst, very quickly and easily, information on various types of relationships which exist between the several functions.

Accordingly it is an object of the invention to display a plurality of functions of the same or a related variable in the form of one color display.

It is a further object to provide a composite display of a plurality of functions of the same or a related variable, in which one such function is displayed in distinct colors and in which the other functions are used to modulate the area of the color trace.

It also provides a color table by which the local color of a trace may be interpreted quantitatively in terms of the variable it represents and which represents the magnitudes of both positive and negative oscillations.

It is a still further object of this invention to provide an additional visual representation of negative oscillations thereby illustrating, in the case seismic data, anomalies preserved in either the positive or negative oscillation and representing geologic changes within the earth.

The invention therefore provides a method of making a combined display of a plurality of functions of the same or a related variable by constructing for each such function a colored trace whose vertical extent represents the independent variable, whose local color represents the local maximum magnitude of each oscillation of the waveform of one function of a dependent variable and whose horizontal extent represents the gain balanced magnitude of the waveform of the same variable, and by arranging such plurality of traces in appropriate positions relative to each other in order to facilitate visual appraisal.

Broadly, this invention is a method of forming a color display from a sequence of input seismic digital data representing trace oscillations having positive and negative amplitude values wherein colors and their extents are indicative of trace amplitude values comprising the steps of:

(a) processing the sequence of input digital data to obtain a sequence of absolute amplitude values to select an absolute amplitude value corresponding to the maximum amplitude for each oscillation, thereby obtaining a sequence of the maximum absolute amplitude values, (b) classifying a predetermined number of the largest selected absolute amplitude values into a first range of values, (c) classifying the remaining absolute amplitude values, according to magnitude, into five additional ranges descending in magnitude from the first range, (d) forming a table in which each range is represented by a primary or secondary color, (e) processing the sequence of input digital data to obtain a sequence of gain balanced seismic digital data, (f) processing the sequence of input data to select data having absolute amplitude values which fall within a first group of said ranges corresponding to a first primary color, (g) preparing a visual representation of the positive and negative gain balanced data representing trace oscillations corresponding to the selected data, (h) transferring an image of the visual representation to a sensitized sheet, (i) desensitizing the sheet except in the region of the image, (j) coloring the image so transferred with the primary color, (k) resensitizing the sheet, (l) in sequence, processing the sequence of input data to select trace amplitudes values which fall within a second group of ranges corresponding to a second primary color and repeating steps (g) through (k), (m) in sequence, processing the sequence of input data to select trace amplitudes values which fall within a third group of ranges corresponding to a third primary color and repeating steps (g) through (j) whereby the primary colors by virtue of random complementary addition operate to generate six colors (three primary and three secondary colors) effective to indicate differing ranges of amplitude values in accordance with the table.

DETAILED DESCRIPTION OF THE INVENTION

Figure 1:
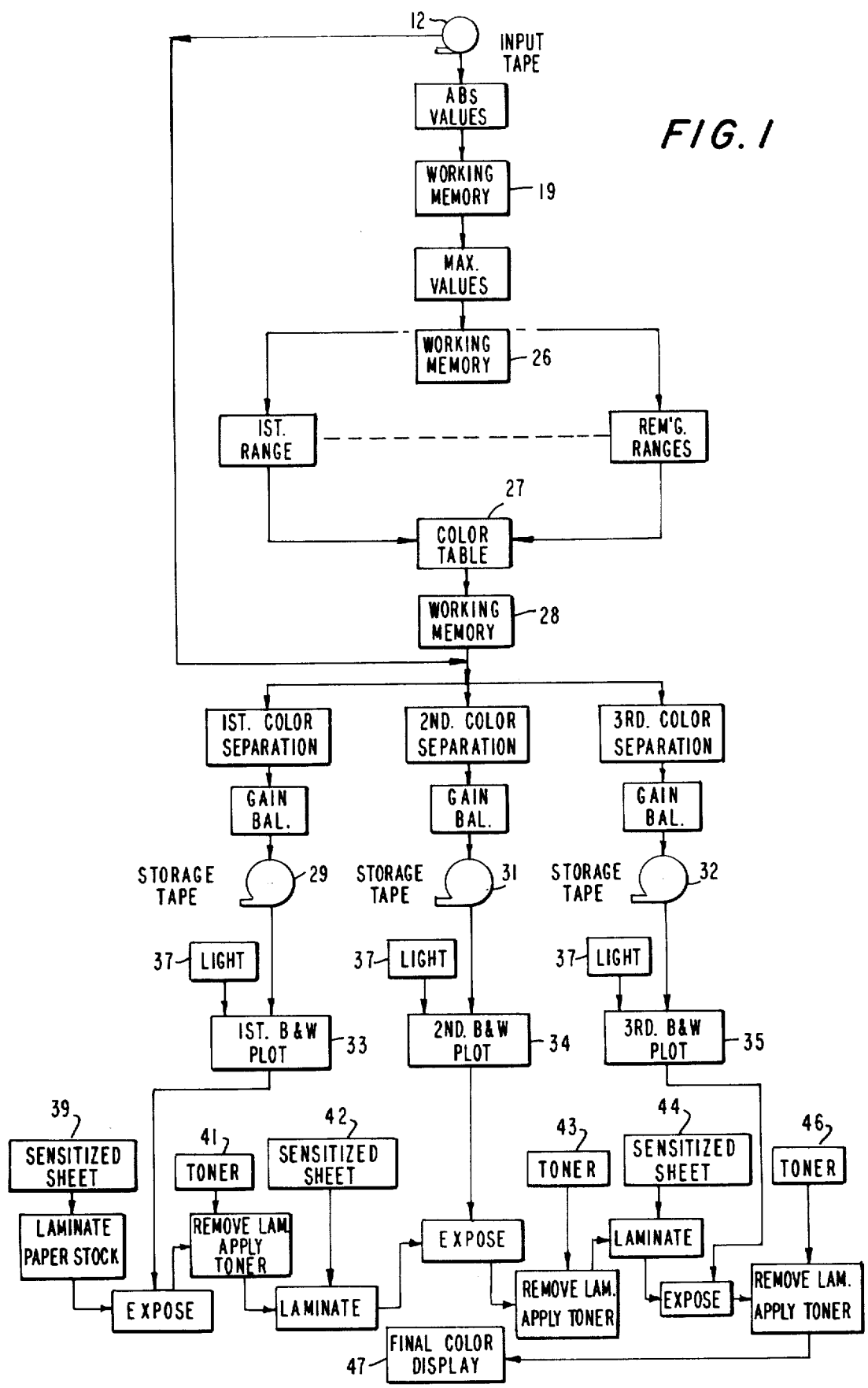
FIG. 1 shows, in block-diagram form, the stages of operating on a sequence of input data to make a six color display.
Figure 2:
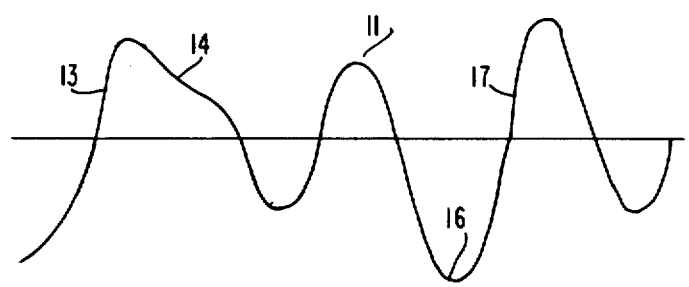
FIG. 2 shows a waveform for a single function, in this case, true amplitude.
Figure 3:
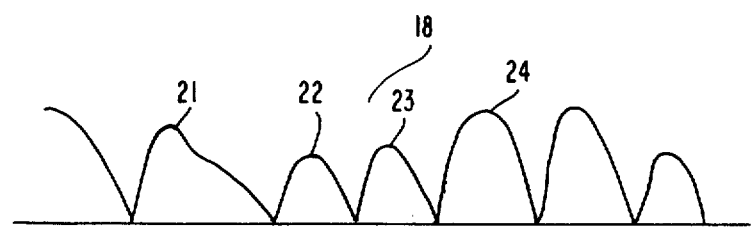
FIG. 3 shows a waveform after the data has been processed to produce absolute values.

The method of the invention for the formation of color displays from input data is exemplified in FIG. 1 of the drawing, a flow diagram which is described in detail as follows. Sequences of input data representing different physical measurements as waveforms are recorded from well known field instruments and techniques. The measurements are taken as a function of time. FIG. 2 illustrates a variable function of waveform 11. The input data is recorded on a tape 12 in the conventional manner, from which the data may be called out on demand. A sequence of input data points 13, 14, 16 and 17 of FIG. 2 representing one function is called out from tape 12 and suitably processed to obtain a sequence of absolute values represented as waveform 18 in FIG. 3. The sequence of absolute values is stored in a working memory 19. The sequence of absolute values is then processed to select the maximum values, points 21-24 of FIG. 3, which correspond to the maximum amplitude of each oscillation of the waveform 18. The sequence of selected maximum values is stored in working memory 26. The sequence of selected maximum values is then drawn out of storage 26 and processed to classify a predetermined number of the largest selected values into a first range of values. The remaining values are scaled according to magnitude into five additional ranges in decending magnitude from the first range. Each range is designated a primary or secondary color, i.e. a complement of the primary color, to form a color assignment table 27. The ranges are stored in working memory 28. The primary colors include cyan, magenta and yellow. The secondary colors for a six color display would include red, violet and green.

A sequence of selected maximum absolute values falling within ranges which correspond to a first primary color, for this example, cyan, are drawn out of memory 28. The ranges having colors which would correspond to the primary color cyan in a six color display would be cyan, red and violet. Input data corresponding to the oscillations of this sequence of values is called out of tape 12. The input data is gain balanced by well-known techniques and stored on a tape 29. A second and third sequence of absolute values for a second and third primary colors, magenta and yellow respectively, are drawn out of memory 28. The data corresponding to each sequence is sequentially called out of tape 12, gain balanced and stored on tapes 31 and 32 respectfully.

The positive and negative gain balanced data representing trace oscillations corresponding to the first primary color, cyan, is called out of tape 29, processed, and formatted in a manner appropriate to the type of plotter to be used. One example of a suitable plotter is GEOSPACE (black and white) camera 34/10. The formatted data is plotted to form a visual representation of the data. The plotter plots a representation 33 in black with the horizontal amplitude of black being related to the level of the particular corresponding gain balanced data. The plotting step is repeated for the data stored on tapes 31 and 32 forming representations 34 and 35 respectively.

The representation, 33 so formed by the plotter is then placed in register between a light source 37 and a sheet 38 to which a light sensitive lamination 39 has been applied. One example of a laminator useful for applying such lamination is model 2700 (Dupont Equipment Co., Wilmington, Delaware). The light sensitive sheet is exposed to the light source thereby transferring the image of the first representation 33 to the sheet. The lamination 39 is removed from the sheet thereby leaving sensitive areas corresponding to the image of the representation. A cyan colored toner dye 41 is applied to the sheet, adhering only to sensitive image areas and thereby desensitizing these areas.

A second light sensitive lamination 42 is applied to the sheet 38 and the light exposure step is repeated for representation 34, the lamination 42 is removed, and a magenta colored toner dye 43 is applied.

A third light sensitive lamination 44 is applied to the sheet 38 and the light exposure step is repeated for representation 35. The lamination 44 is removed and a yellow colored toner dye 46 is applied, thereby producing the final color display 47 of FIG. 4. A finish coat (not shown) may be applied to sheet 38.

Figure 4:
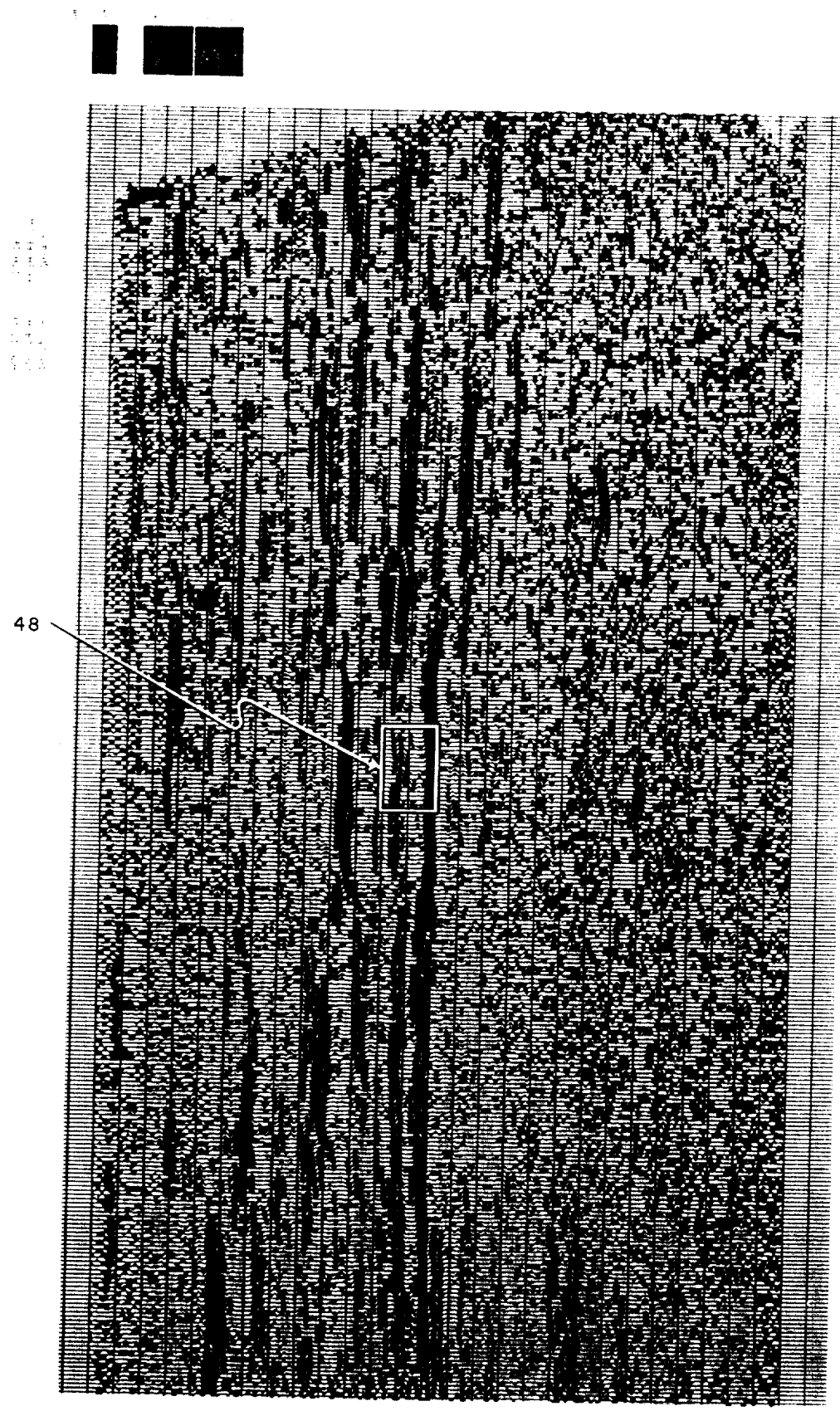
FIG. 4 shows a color photographic reproduction of the true amplitude for a seismographic section.
Figure 5:
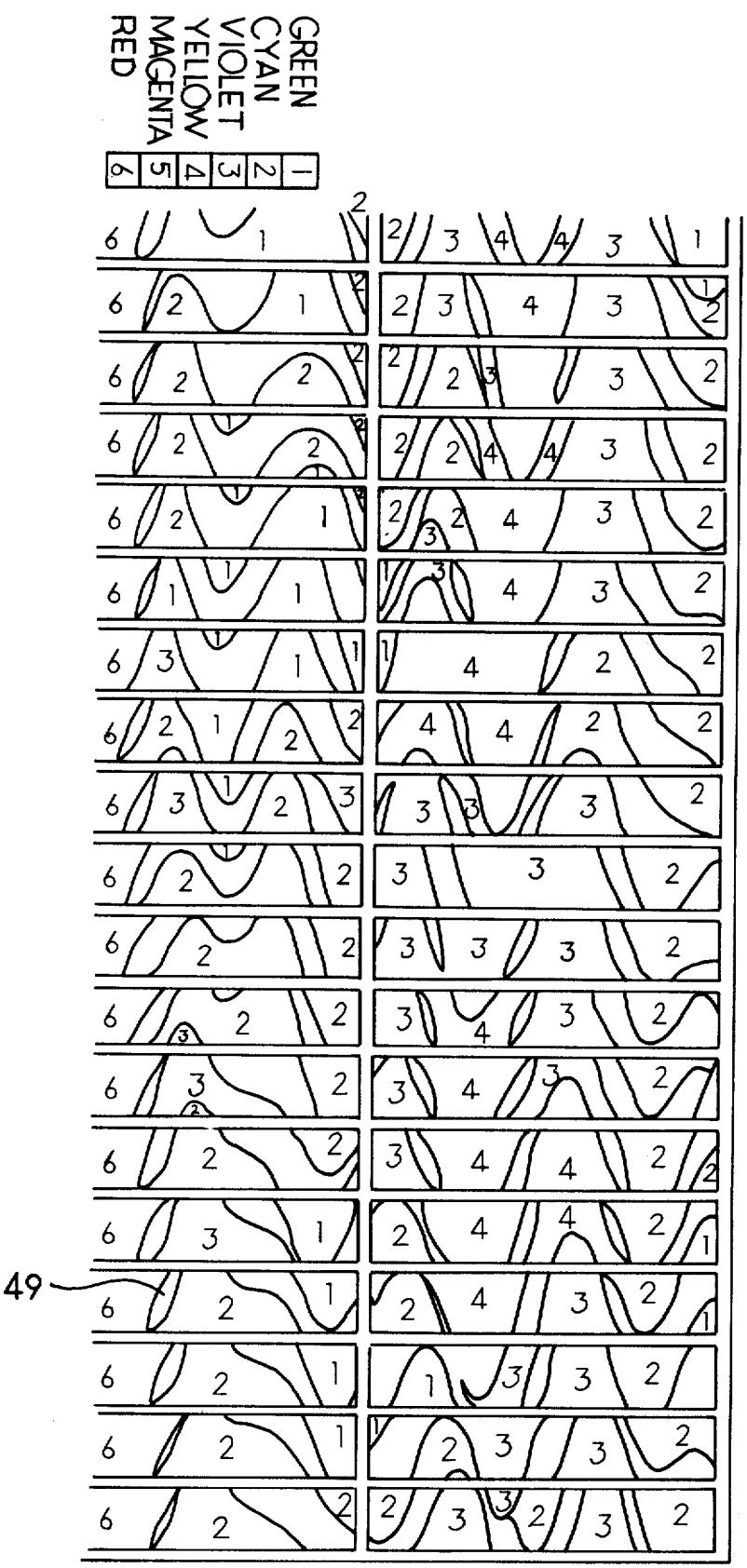
FIG. 5 is an enlarged color photograph reproduction of a portion of FIG. 4 showing the true amplitude waveforms of FIG. 2 after it has been processed according to the invention.

The overall trace section is illustrated by FIG. 4. The box 48 of FIG. 4 has been enlarged to produce FIG. 5 which illustrates the coloration of the finished product. Trace 49 is produced from the waveforms 11 and 18.

The method of this invention is useful on a dependent function and functions of one common variable. Preferably, the method can be used on dependent seismic functions including velocity, amplitude, frequency, attenuation, and energy. Certain of these functions are diagnostic of hydrocarbon saturation and/or while others bring out the structure of the formation. The energy function is a showing of the relative strength of the peaks and troughs of an amplitude waveform. The velocity function shows the rate of speed at which sound waves travel through the rock formation. The amplitude function is a showing of the strength of reflections of the sound waves. The frequency function is the frequency of the sound waves in the rock formation, i.e. the frequency of each individual peak and trough of the amplitude function. The attenuation or absorption function is a showing of the loss of energy of sound waves within the rock formation.

Figure 6:
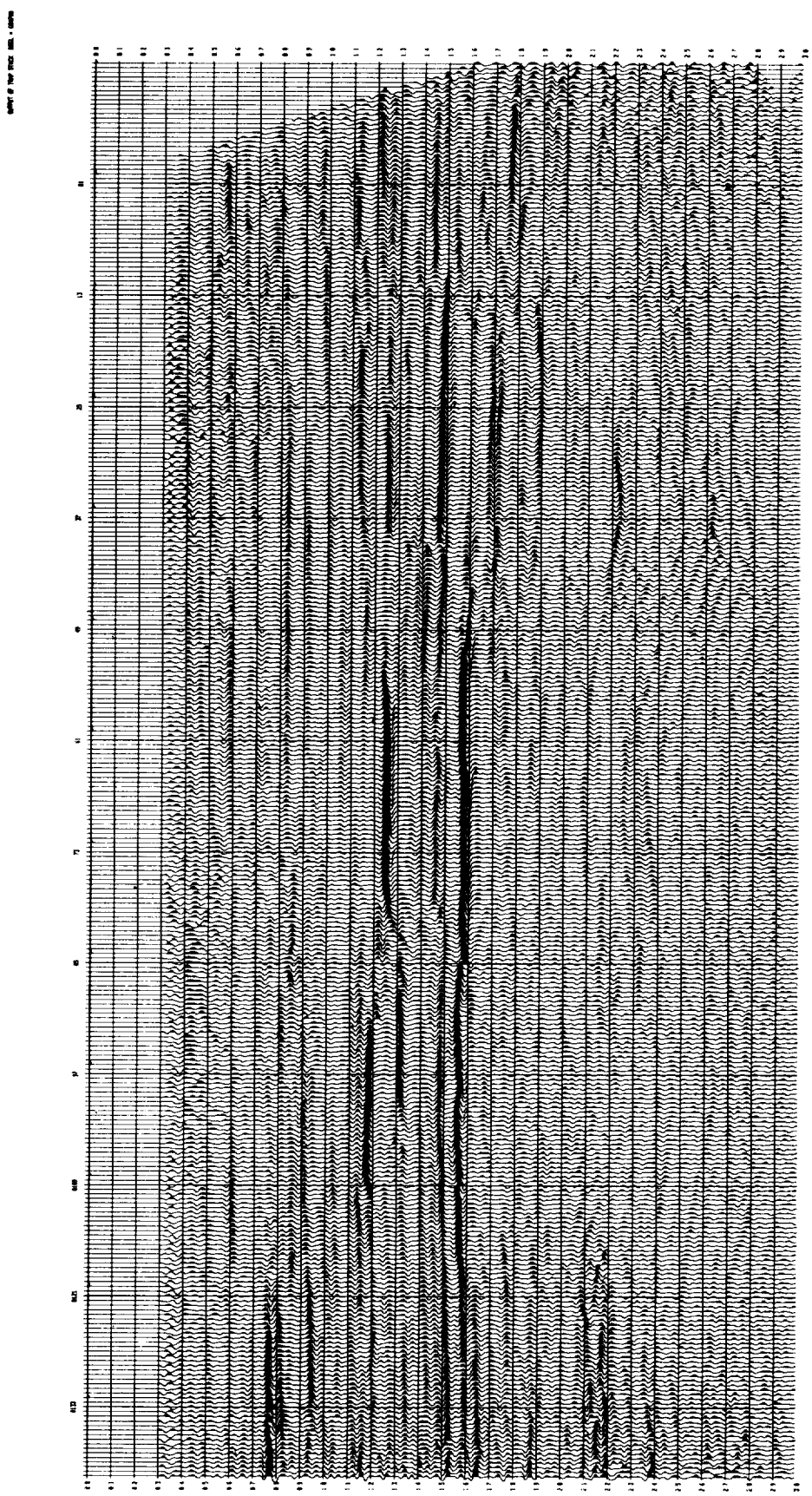
FIG. 6 is a black and white photographic reproduction of the true amplitude for a seismographic section.

The data of each of the above functions is generally gain balanced prior to storage on tape 29, 31 and 32 except in the case of data for the velocity function. The color display can be prepared for all functions without gain balancing the input data going into storage on tapes 29, 31 and 32. Representation without gain balancing in a conventional black and white manner is illustrated in FIG. 6. Without gain balancing, one disadvantage is that the low amplitude primary oscillation cannot be seen clearly if the overall waveform is displayed at appropriate levels. The gain balance technique does have its disadvantages, those being that the trace amplitude relationship between different primary waveforms is lost, the multiple reflections attenuated by the stacking process are restored to obtrusive amplitudes and the background noise is likewise elevated in amplitude. The method of this invention reduces these disadvantages since the gain balanced data is used only for the extent of the waveforms and the color of the waveform is determined by the original input data.

Figure 7:
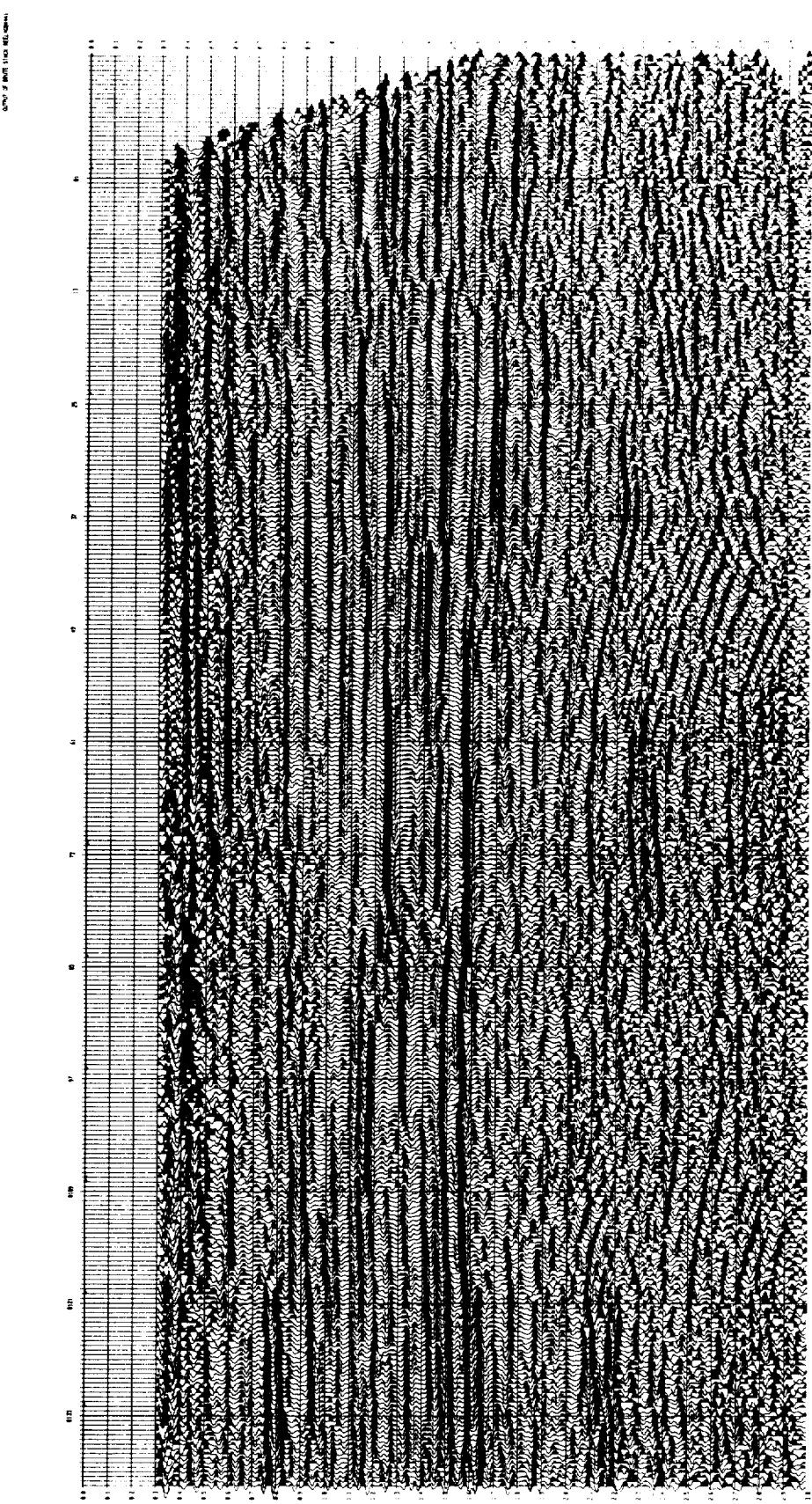
FIG. 7 is a black and white photograph reproduction of the true amplitude (equalized) from a seismographic section.

Alternatively to gain balancing the separated data corresponding to a primary color, the entire sequence of input data may be gain balanced and placed in a working memory (not sh wn). A representation in a conventional black and white manner having the entire sequence of input data gair balanced (together?) is illustrated in FIG. 7. The gain balanced values corresponding selected maximum absolute values falling in ranges which correspond to the first primary color, cyan, are called from storage memory. The values are stored on tape 29. The method is repeated for the second and third primary colors and stored on tapes 31 and 32 respectively.

The method of forming color display preferably uses six colors, three primary colors and three secondary colors (compliments of the three primaries). More or less than six colors may be used. However, more than six colors produce an effect where contiguous colors become increasingly difficult to distinguish and therefore values of such colors are difficult to determine.

One advantage to the present invention is the coloration of the entire oscillation in a single color, which better indicates the characteristics of the rock formation over the prior art method.

The method of and the actual coloration of the negative oscillations or troughs allows the analyst to more readily determine anomolies within a given rock formation.

In general, present geologic knowledge indicated that rocks increase in density with depth. This results in a showing of increased sound velocity on a seismic display. It is also been found that the presence of hydrocarbons reduce the sound velocity of the host rock formation. This reduced velocity will show as a negative reflection in a seismic section. This anomalies reflection can only be brought to the visual attention of the analyst by means of the present invention coloration of negative oscillations as well as the positive oscillations.

The use of working memories, tapes and locations on particular tapes is equivalent in function and therefore is interchangeable, i.e., tapes 29, 31 and 32 may be working memories or separate locations on particular tapes.

Although the practice of the invention has been described primarily with reference to a specific example, this examples does not limit the invention. The same techniques are appropriate wherever the interpretation of a plurality of variables is best done by a skilled human analyst, and where the problem is the optimum manner of transferring the interrelation between these variables to the analyst visually.

We claim:

1. A method of forming a color display from a sequence in input seismic digital data representing trace oscillations having positive and negative amplitude values wherein colors and their extents are indicative of trace amplitude values comprising the steps of:
    (a) processing the sequence of input digital data to obtain a sequence of absolute amplitude values
    (b) selecting an absolute amplitude value corresponding to the maximum amplitude for each oscillation, thereby obtaining a sequence of said maximum absolute amplitude values,
    (c) classifying a predetermined number of the largest selected absolute amplitude values into a first range of values,
    (d) classifying the remaining absolute amplitude values, according to magnitude, into five additional ranges descending in magnitude from said first range,
    (e) forming a table in which each range is represented by a primary or secondary color,
    (f) processing said sequence of input digital data to obtain a sequence of gain balanced seismic digital data,
    (g) processing said sequence of input data to select data having absolute amplitude values which fall within a first group of said ranges corresponding to a first primary color,
    (h) preparing a visual representation of said positive and negative gain balanced data representing trace oscillations corresponding to said selected data,
    (i) transferring an image of said visual representation to a sensitized sheet,
    (j) desensitizing said sheet except in the region of said image,
    (k) coloring said image so transferred with said primary color,
    (l) resensitizing said sheet,
    (m) in sequence, processing said sequence of input data to select trace amplitudes values which fall within a second group of ranges corresponding to a second primary color and repeating steps (h) through (l),
    (n) in sequence, processing said sequence of input data to select trace amplitudes values which fall within a third group of ranges corresponding to a third primary color and repeating steps (h) through (k), whereby said primary colors by virtue of random complementary addition operate to generate six colors (three primary and three secondary colors) effective to indicate differing ranges of amplitude values in accordance with the table.

2. The method of claim 1 wherein steps (g) and (h) comprise the additional steps of:
    (a) processing said sequence of input data to select data having positive amplitude values, said amplitude values falling within said first group of said ranges corresponding to a first primary color,
    (b) preparing a visual representation of positive gain balanced data corresponding to said selected data,
    (c) processing said sequence of input data to select data having negative amplitude values for which the absolute amplitude values fall within said first group,
    (d) preparing a visual representation of gain balanced data corresponding to said selected negative data,
    (e) superposing said positive visual representation in register to form a composite visual representation.

* * * * *